(12) United States Patent
You et al.

(10) Patent No.: US 11,532,857 B2
(45) Date of Patent: Dec. 20, 2022

(54) BATTERY MODULE

(71) Applicant: CONTEMPORARY AMPEREX TECHNOLOGY CO., LIMITED, Fujian (CN)

(72) Inventors: Kaijie You, Fujian (CN); Linggang Zhou, Fujian (CN); Dongyang Shi, Fujian (CN); Yanhuo Xiang, Fujian (CN); Yongshou Lin, Fujian (CN); Fei Hu, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 35 days.

(21) Appl. No.: 17/139,814

(22) Filed: Dec. 31, 2020

(65) Prior Publication Data
US 2021/0126321 A1    Apr. 29, 2021

Related U.S. Application Data

(63) Continuation of application No. PCT/CN2020/072265, filed on Jan. 15, 2020.

(30) Foreign Application Priority Data

Jan. 18, 2019    (CN) .......................... 201920084533.0

(51) Int. Cl.
*H01M 50/507*    (2021.01)
*H01M 50/244*    (2021.01)
(Continued)

(52) U.S. Cl.
CPC ..... *H01M 50/507* (2021.01); *H01M 10/0587* (2013.01); *H01M 50/207* (2021.01);
(Continued)

(58) Field of Classification Search
CPC ............. H01M 50/507; H01M 50/502; H01M 50/209; H01M 50/547; H01M 50/298;
(Continued)

(56) References Cited

U.S. PATENT DOCUMENTS 9,257,728 B2    2/2016 Adachi et al.
2009/0208836 A1    8/2009 Fuhr et al.
(Continued)

FOREIGN PATENT DOCUMENTS

CN    101809786 A    8/2010
CN    103137936 A    6/2013
(Continued)

OTHER PUBLICATIONS

Machine translation of CN108666462A (Year: 2018).*
Machine translation of CN108666515A (Year: 2018).*

*Primary Examiner* — William E McClain
*Assistant Examiner* — Jason Barton
(74) *Attorney, Agent, or Firm* — Scully Scott Murphy & Presser

(57) ABSTRACT

The present disclosure provides a battery module, including a first battery cell arrangement structure, a second battery cell arrangement structure and a bus bar array. With battery cells stacked in a horizontal direction, a first battery cell arrangement structure and a second battery cell arrangement structure are stacked in a vertical direction, and a first bus bar of a bus bar array is used to sequentially connect the battery cells of the first battery cell arrangement structure and the second battery cell arrangement structure. As a result, a total positive electrode and a total negative electrode of a battery module are located at two ends of the battery module, which greatly reduces the possibility of a short circuit of the battery module and improves the safety of the battery module.

15 Claims, 4 Drawing Sheets

(51) Int. Cl.
  *H01M 50/547* (2021.01)
  *H01M 50/207* (2021.01)
  *H01M 50/342* (2021.01)
  *H01M 10/0587* (2010.01)

(52) U.S. Cl.
  CPC ....... *H01M 50/244* (2021.01); *H01M 50/342* (2021.01); *H01M 50/547* (2021.01); *H01M 2200/10* (2013.01); *H01M 2200/20* (2013.01)

(58) Field of Classification Search
  CPC ............. H01M 50/503; H01M 50/514; H01M 50/244; H01M 50/342; H01M 10/0587; H01M 2200/10; H01M 2200/20; H01M 50/50; H01M 50/207
  See application file for complete search history.

(56) References Cited

U.S. PATENT DOCUMENTS

| | | | |
|---|---|---|---|
| 2010/0266887 A1 | 10/2010 | Sekino et al. | |
| 2011/0177368 A1 | 7/2011 | Maguire | |
| 2013/0130071 A1 | 5/2013 | Adachi et al. | |
| 2014/0050967 A1 | 2/2014 | Fuhr et al. | |
| 2018/0123159 A1* | 5/2018 | Kim | H01M 10/6568 |
| 2019/0207279 A1 | 7/2019 | Oda et al. | |
| 2020/0235372 A1 | 7/2020 | Fuhr et al. | |

FOREIGN PATENT DOCUMENTS

| | | | |
|---|---|---|---|
| CN | 108666462 A | 10/2018 | |
| CN | 108666515 A | 10/2018 | |
| CN | 208173649 U | 11/2018 | |
| CN | 209730034 U | 12/2019 | |
| JP | 2000182583 A | 6/2000 | |

* cited by examiner

BATTERY MODULE

CROSS-REFERENCE TO RELATED APPLICATIONS

This application is a continuation of International Application No. PCT/CN2020/072265, filed on Jan. 15, 2020, which claims priority to Chinese Patent Application No. 201920084533.0, filed on Jan. 18, 2019. The disclosures of the aforementioned applications are hereby incorporated by reference in their entireties.

TECHNICAL FIELD

The present disclosure relates to the technical field of batteries, in particular to a battery module.

BACKGROUND

In the prior art, when battery cells are grouped, in order to facilitate an electrical connector to connect positive and negative electrodes on the respective battery cells, the positive and negative electrodes of the battery cells are placed in the same direction, thereby avoiding a wrong electrical connection and a short circuit due to a wrong direction of a battery cell when the positive and negative electrodes of the battery cells are alternatively arranged.

However, a total positive electrode and a total negative electrode of an electrode connector of the existing battery module are on the same side of the battery module, which is thus easy to cause problems such as insufficient space for electrical connection, difficult operation, and lower safety of the battery module.

SUMMARY

The present disclosure provides a battery module to solve the problem of a single structure of the existing electrical connector.

To achieve the above objective, the inventor provides a battery module including a first battery cell arrangement structure, a second battery cell arrangement structure and a bus bar array. The first battery cell arrangement structure and the second battery cell arrangement structure are stacked in a vertical direction. The first battery cell arrangement structure and the second battery cell arrangement structure both include a plurality of battery cells arranged in a horizontal direction, the battery cell includes a first electrode terminal, a second electrode terminal and a battery housing, and the first electrode terminal and the second electrode terminal are disposed on a surface of the battery housing. The bus bar array electrically connects the plurality of battery cells. The bus bar array includes a first bus bar, one end of the first bus bar is connected to the first electrode terminal of the first battery cell array structure, the other end of the first bus bar is connected to the second electrode terminal of the second battery cell arrangement structure, and the first bus bar extends in a first direction, and the first direction intersects the horizontal direction and the vertical direction.

As a structure of the present disclosure, the first battery cell arrangement structure and the second battery cell arrangement structure are stacked to form one module, and a size of the one module in the horizontal direction is larger than a size of the one module in the vertical direction.

As a structure of the present disclosure, the battery cell further includes: an electrode assembly, where the electrode assembly is accommodated in the battery housing. The electrode assembly includes a first electrode sheet, a second electrode sheet and a separator disposed between the first electrode sheet and the second electrode sheet, the first electrode terminal is electrically connected to the first electrode sheet, and the second electrode terminal is electrically connected to the second electrode sheet. The electrode assembly is in a winding structure and is flat-shaped, an outer surface of the electrode assembly includes two flat surfaces, and the two flat surfaces face each other in the vertical direction; or, the electrode assembly is in a laminated structure, and the first electrode sheet, the separator and the second electrode sheet are stacked in the vertical direction.

As a structure of the present disclosure, the first bus bar includes a first end portion, a transition portion and a second end portion, the first end portion is connected to the first electrode terminal, the second end portion is connected to the second electrode terminal, and the transition portion connects the first end portion and the second end portion.

As a structure of the present disclosure, the battery housing is provided with an explosion-proof valve, the explosion-proof valve is disposed between the first electrode terminal and the second electrode terminal, and the first bus bar is set to avoid the explosion-proof valve.

As a structure of the present disclosure, the transition portion is disposed between explosion-proof valves of two battery cells stacked in the vertical direction.

As a structure of the present disclosure, the transition portion is provided with a mounting opening that penetrates the transition portion in the horizontal direction.

As a structure of the present disclosure, a shape of a cross section of the first bus bar parallel to the vertical direction and the horizontal direction is an "S"-shaped structure.

As a structure of the present disclosure, the bus bar array further includes: a second bus bar, where the second bus bar extends in the horizontal direction, two ends of the second bus bar are respectively connected to two adjacent battery cells in the horizontal direction, and the number of second bus bars is odd.

As a structure of the present disclosure, the bus bar array further includes: a third bus bar, where the third bus bar extends in a second direction, one end of the third bus bar is connected to the first electrode terminal of the battery cell of the first battery cell arrangement structure, the other end of the third bus bar is connected to the second electrode terminal of the battery cell of the second battery cell arrangement structure, and the second direction and the first direction are symmetrical in a vertical plane perpendicular to the horizontal direction.

As a structure of the present disclosure, the battery module further includes a total positive electrode connecting piece and a total negative electrode connecting piece, the total positive electrode connecting piece is electrically connected to a total positive electrode of the battery module, and the total negative electrode connecting piece is electrically connected to a total negative electrode of the battery module. The total positive electrode connecting piece and the total negative electrode connecting piece are respectively located at two ends of the battery module in the horizontal direction.

As a structure of the present disclosure, both the total positive electrode connecting piece and the total negative electrode connecting piece are both connected to the first battery cell arrangement structure.

As a structure of the present disclosure, the battery housing includes two first surfaces and two second surfaces, and an area of the first surface is larger than an area of the second surface. In the battery cell, the two second surfaces face each other in the horizontal direction, and the two first surfaces face each other in the vertical direction.

Different from the prior art, in the above technical solution, with battery cells stacked in a horizontal direction, a first battery cell arrangement structure and a second battery cell arrangement structure are stacked in a vertical direction, and a first bus bar of a bus bar array is used to sequentially connect the battery cells of the first battery cell arrangement structure and the second battery cell arrangement structure. As a result, a total positive electrode and a total negative electrode of a battery module are located at two ends of the battery module, which greatly reduces the possibility of a short circuit of the battery module and improves the safety of the battery module.

DESCRIPTION OF REFERENCE SIGNS

Figure 1:
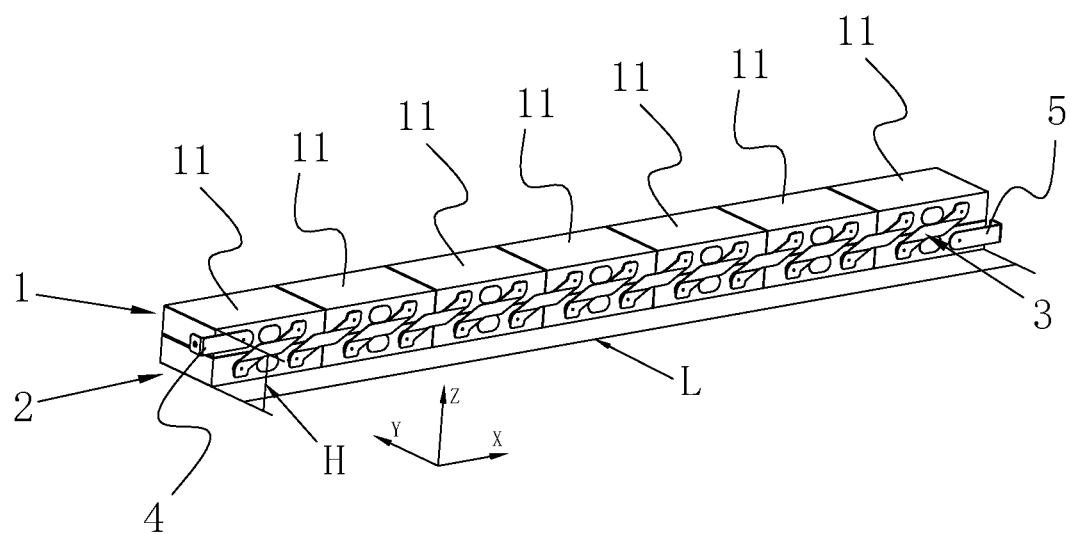
FIG. 1 is a structural diagram of a battery module of the present disclosure.

1. First battery cell arrangement structure;
   11. Battery cell;
      11a. Electrode assembly with winding structure; 11b. Electrode assembly with laminated structure;
      111. Electrode assembly; 112. Battery housing; 113. First electrode terminal;
      114. Second electrode terminal; 115. Explosion-proof valve;
         1110. Flat surface; 1111. First electrode sheet; 1112. Second electrode sheet;
         1113. Separator; 1121. First surface; 1122. Second surface;
2. Second battery cell arrangement structure;
3. Bus bar array;
   31. First bus bar; 32. Second bus bar; 33. Third bus bar;
      311. First end portion; 312. Transition portion; 313. Second end portion; 314. Mounting opening;
4. Total positive electrode connecting piece;
5. Total negative electrode connecting piece;
L is the length of the first battery cell arrangement structure and the second battery cell arrangement structure;
H is the height obtained when the first battery cell arrangement structure and the second battery cell arrangement structure are stacked.

DESCRIPTION OF EMBODIMENTS

In order to describe in detail the technical content, structural features, and intended objectives and effects of the present disclosure, the following provides detailed description with reference to embodiments and accompanying drawings.

In the description of the present application, unless otherwise specified and limited explicitly, the terms such as "first" and "second" are merely intended for a purpose of description, and shall not be understood as an indication or implication of relative importance. Unless otherwise specified or illustrated, the term "a plurality of" refers to two or more; the terms "connection" and "fixing" should be understood broadly, for example, the "connection" may either be a fixed connection, or a detachable connection, or an integrated connection, or an electrical connection; and the "connection" may either be a direct connection, or an indirect connection through an intermediary. For those of ordinary skill in the art, the specific meanings of the above-mentioned terms in the present disclosure can be understood according to specific circumstances.

In the description of the present application, in all the drawings, a direction indicated by an arrow X is a length direction, a direction indicated by an arrow Y is a width direction, and a direction indicated by an arrow Z is a vertical direction. A horizontal direction is a direction parallel to a horizontal plane, and may either be the above length direction or the above width direction. In addition, the horizontal direction includes not only a direction absolutely parallel to the horizontal plane, but also a direction substantially parallel to the horizontal plane conventionally recognized in engineering. The vertical direction is a direction perpendicular to the horizontal plane, and the vertical direction includes not only a direction absolutely perpendicular to the horizontal plane, but also a direction substantially perpendicular to the horizontal plane conventionally recognized in engineering. In addition, orientation words such as "upper", "lower", "top" and "bottom" described in the present application are all understood with respect to the vertical direction. In order to facilitate understanding and description, description of a direction will be given below according to a coordinate system of X, Y, and Z in the drawings.

Please refer to FIG. 1, the present disclosure provides a battery module including a first battery cell arrangement structure 1, a second battery cell arrangement structure 2 and a bus bar array 3. The first battery cell arrangement structure 1 consists of a plurality of battery cells 11 that are adjacent to each other in parallel to a vertical plane (a plane where a Z axis and a Y axis are located) and are arranged in a single layer in a horizontal direction (an X-axis direction). Similarly, all battery cells 11 in the second battery cell arrangement structure 2 are also adjacent to each other in parallel to the vertical plane (the plane where the Z axis and the Y axis are located) and are arranged in a single layer in the horizontal direction (the X-axis direction). Therefore, after the first battery cell arrangement structure 1 and the second battery cell arrangement structure 2 are stacked in a vertical direction (a Z-axis direction), the battery module is in a two-layered structure, and then the bus bar array 3 is used to sequentially connect the battery cells 11 in the first battery cell arrangement structure 1 and the second battery cell arrangement structure 2. Moreover, the first battery cell arrangement structure 1 and the second battery cell arrangement structure 2 have the same size after arrangement in the horizontal direction (the X-axis direction) in this embodiment, and their length is larger than a size in the vertical direction (the Z-axis direction) after stacking. Suppose that the length of the first battery cell arrangement structure and the second battery cell arrangement structure is L, and the height obtained when the first battery cell arrangement structure and the second battery cell arrangement structure are stacked is H, L is larger than H. As a result, after the bus bar array 3 is connected and arranged, a total positive electrode connecting piece 4 and a total negative electrode connecting piece 5 of the battery module can be respectively located on two ends of the battery module, which greatly avoids the possibility of a short circuit of the battery module.

Figure 2:
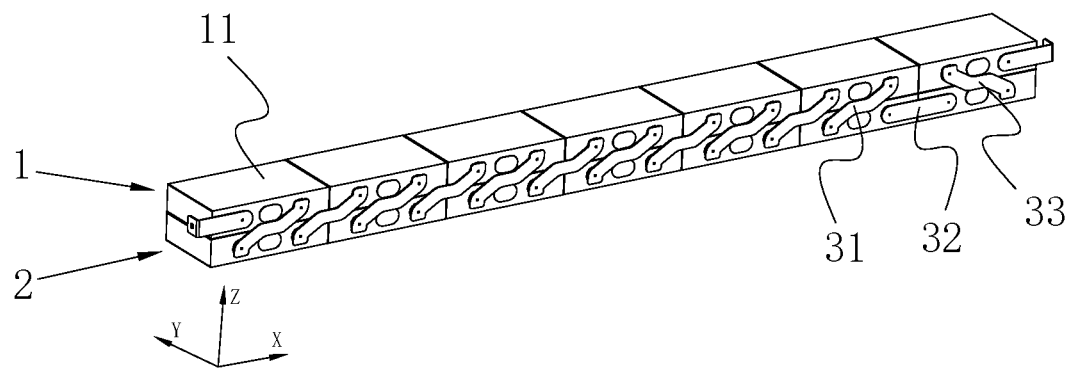
FIG. 2 is a schematic diagram of a battery module of the present disclosure.

As shown in FIG. 2, a second bus bar 32 is connected to two adjacent battery cells 11 in series in the horizontal direction (the X-axis direction), and the second bus bar 32 extends in the horizontal direction (the X-axis direction). Therefore, when the number of second bus bars 32 is odd, a total positive electrode connecting piece and a total negative electrode connecting piece located at two ends of a battery module will be located on the same battery cell arrangement structure. In this embodiment, they will be located at two ends of the first battery cell arrangement structure 1. When the number of second bus bars 32 is even, a total positive electrode connecting piece and a total negative electrode connecting piece at two ends of a battery module will be located on different battery cell arrangement structures, that is, the total positive electrode connecting piece and the total negative electrode connecting piece are respectively located on the first battery cell arrangement structure 1 and the second battery cell arrangement structure 2. Therefore, it is possible to separate the total positive electrode connecting piece and the total negative electrode connecting piece of the battery module, which greatly avoids the problem of a short circuit of the battery module.

As shown in FIG. 2, a third bus bar 33 in this embodiment extends in a second direction (in a direction opposite to an X-axis arrow), while a first bus bar 31 extends in a first direction (in a direction of the X-axis arrow). Description is made by an example that the number of second bus bars 32 is one. First, the first battery cell arrangement structure 1 and the second battery cell arrangement structure 2 are sequentially connected in the first direction (the X-axis direction) through the first bus bar, and the last two battery cells 11 stacked up and down are left unconnected. The two battery cells 11 are rotated by 180 degrees (rotated around a Y axis), so that two adjacent opposite electrode terminals are located on the same battery cell arrangement structure, and then the second bus bar performs connection, and the last two battery cells 11 are connected through the third bus bar 33, so that the total positive electrode connecting piece and the total negative electrode connecting piece of the battery module are located on the same battery cell arrangement structure, which facilitates an electrical connection between a battery module and a battery module.

Figure 3:
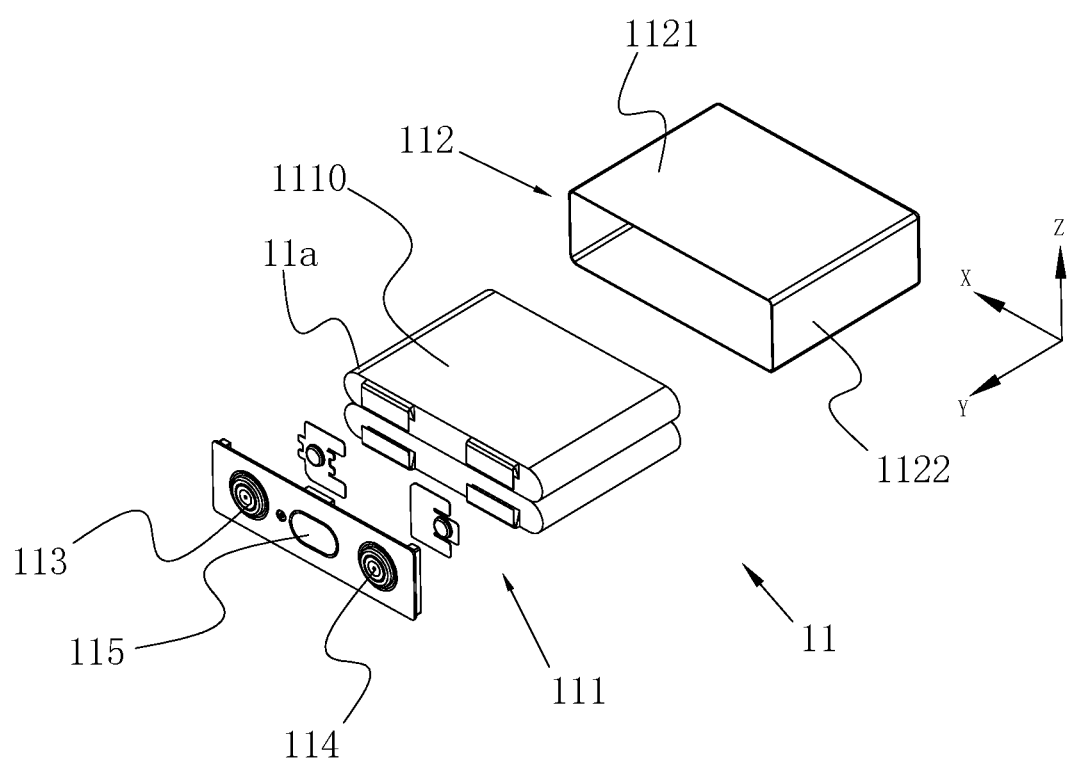
FIG. 3 is an exploded view of a battery cell of a battery module of the present disclosure.

As shown in FIG. 3, the battery cell 11 includes an electrode assembly 111, a battery housing 112, a first electrode terminal 113, a second electrode terminal 114, and an explosion-proof valve 115. The electrode assembly 111 includes a first electrode sheet 1111, a second electrode sheet 1112 and a separator 1113 disposed between the first electrode sheet 1111 and the second electrode sheet 1112. The first electrode sheet 1111 may be a positive electrode sheet or a negative electrode sheet, the second electrode sheet 1112 and the first electrode sheet 1111 have opposite polarities, and accordingly, the second electrode sheet 1112 is a negative electrode sheet or a positive electrode sheet. Illustratively, description is made by an example that the first electrode sheet 1111 is a positive electrode sheet, and the second electrode sheet 1112 is a negative electrode sheet. Similarly, in other embodiments, the first electrode sheet 1111 may also be a negative electrode sheet, and the second electrode sheet 1112 is a positive electrode sheet. The separator 1113 is an insulator between the first electrode sheet 1111 and the second electrode sheet 1112.

The battery housing 112 is in a hexahedral structure. The battery housing 112 includes two first surfaces 1121 and two second surfaces 1122. An area of the first surface 1121 is larger than an area of the second surface 1122. In the battery cells 11, two second surfaces 1122 of each battery cell 11 face each other in the horizontal direction (for example, the X-axis direction), and two first surfaces 1121 of each battery cell 11 face each other in the vertical direction (the Z-axis direction). The battery housing 112 may be made of a material such as aluminum, aluminum alloy, or plastic.

In the embodiment, the battery housing 112 is a cuboid (a hexahedron). The battery housing 112 has an internal space accommodating the electrode assembly 111 and an electrolyte, and the battery housing 112 has an opening. The electrode assembly 111 is accommodated in the battery housing 112, and a cover plate covers the opening and is configured to seal the electrode assembly 111 in the battery housing 112.

Figure 4:
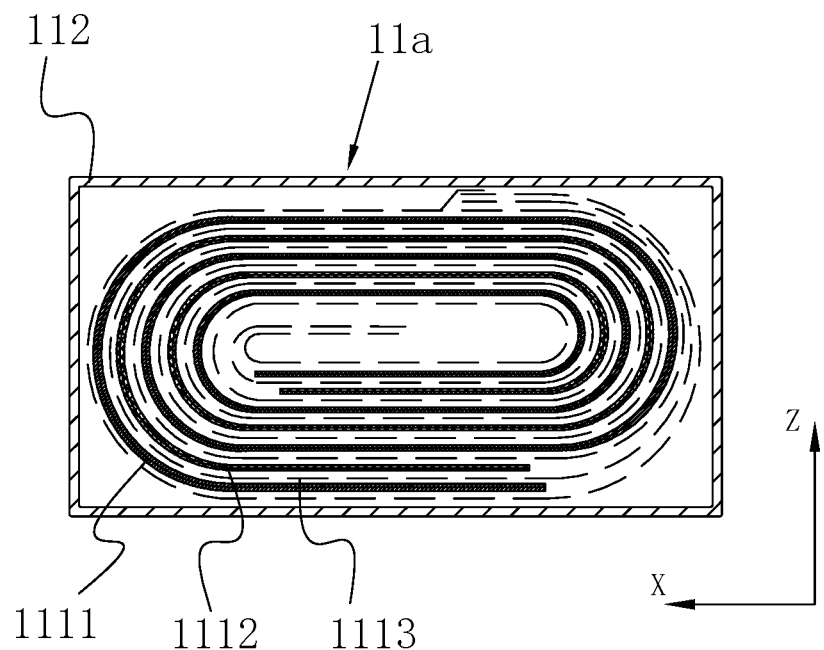
FIG. 4 is a cross-sectional view of a battery cell with a winding structure of a battery module of the present disclosure.
Figure 5:
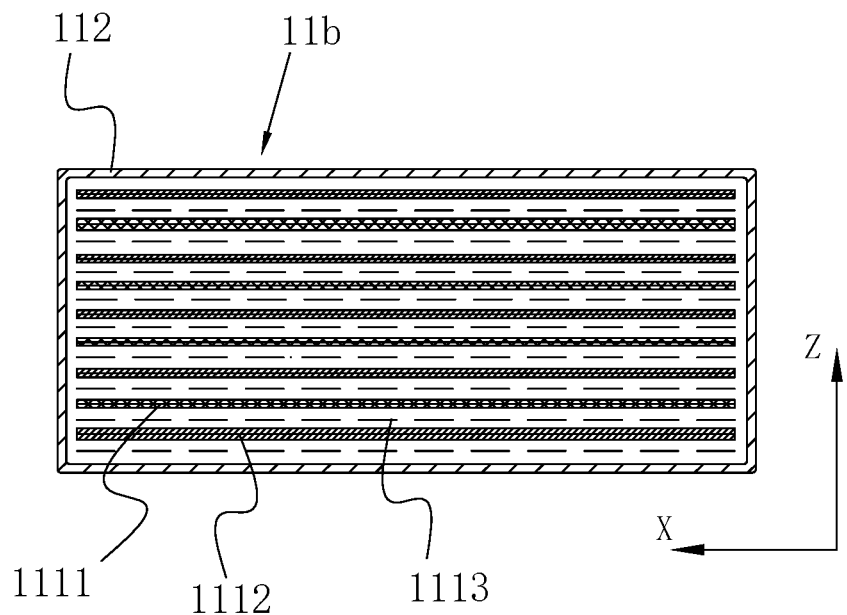
FIG. 5 is a cross-sectional view of a battery cell with a laminated structure of a battery module of the present disclosure.

As shown in FIGS. 4 and 5, the electrode assembly 111 may be an electrode assembly 11a with a winding structure or an electrode assembly 11b with a laminated structure. As shown in FIG. 4, when the electrode assembly 111 is in a winding structure, the electrode assembly 111 is flat-shaped, and an outer surface of the electrode assembly 111 includes two flat surfaces 1110. The two flat surfaces 1110 face each other in the vertical direction (the Z-axis direction), that is, the flat surface 1110 and the first surface 1121 face each other. The electrode assembly 111 is in a substantially hexahedral structure, and the flat surface 1110 is substantially parallel to a winding axis and is an outer surface with the largest area. The flat surface 1110 may be only a relatively even surface, and is not required to be a pure plane. As shown in FIG. 5, when the electrode assembly 111 is in a laminated structure, the first electrode sheet 1111, the separator 1113 and the second electrode sheet 1112 are stacked in the vertical direction (the Z-axis direction), that is, a surface of the first electrode sheet 1111 and the first surface 1121 face each other.

In this embodiment, the first electrode terminal 113 and the second electrode terminal 114 are located on the same surface of the battery housing 112, that is, the first electrode terminal 113 and the second electrode terminal 114 are mounted on the cover plate of the battery cell 11. In addition, the first electrode terminal 113 penetrates the cover plate to be electrically connected to the first electrode sheet, and the second electrode terminal 114 also penetrates the cover plate to be electrically connected to the second electrode sheet. Moreover, in this embodiment, a spacing between the first electrode terminal 113 and the second electrode terminal 114 of the battery cell 11 is equal to a spacing between adjacent first electrode terminal 113 and second electrode terminal 114 of an adjacent battery cell 11 in the same battery cell arrangement structure.

Specifically, a positive active material is coated on a coated region of a positive electrode sheet, and a negative active material is coated on a coated region of a negative electrode sheet. An uncoated region extending from the coated region is used as a tab. The electrode assembly 111 includes two tabs, that is, a positive tab and a negative tab. The positive tab extends from the coated region of the positive electrode sheet; and the negative tab extends from the coated region of the negative electrode sheet. The positive tab and a positive electrode terminal are electrically connected by a positive electrode terminal connector, and the negative tab and a negative electrode terminal are electrically connected by a negative electrode terminal connector.

The explosion-proof valve 115 is mounted on the cover plate of the battery cell 11 between the first electrode terminal 113 and the second electrode terminal 114. When a bus bar is mounted and connected, the bus bar needs to be set to avoid the explosion-proof valve 115 to prevent the bus bar from blocking the explosion-proof valve 115, which ensures that the explosion-proof valve 115 can be disengaged when thermal runaway of the battery cell 11 occurs, and will not cause an explosion. The specific avoidance method and structure are described by a bus bar below.

Figure 6:
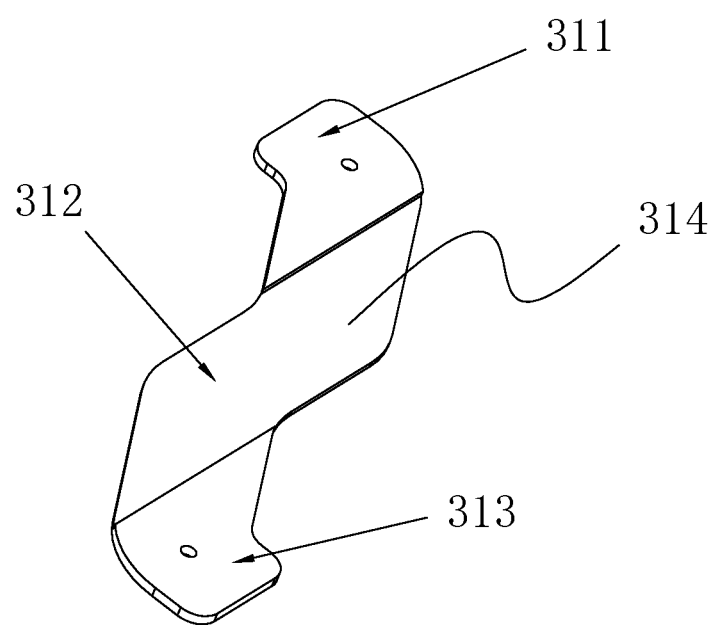
FIG. 6 is a structural diagram of a first bus bar of a battery module of the present disclosure.

As shown in FIG. 6, the bus bar array 3 includes a first bus bar 31, a second bus bar 32 and a third bus bar 33. The first bus bar 31 has an "S"-shaped structure, and the first bus bar 31 includes a first end portion 311, a transition portion 312 and a second end portion 313. The first end portion 311 is connected to one end of the transition portion 312, and the second end portion 313 is connected to the other end of the transition portion 312, so that a shape of the first bus bar 31 is similar to an "S"-shaped structure, and the first end portion 311, the transition portion 312 and the second end portion 313 can be manufactured by integral molding, which improves the structural stability of the first bus bar 31.

In this embodiment, the transition portion 312 is disposed between explosion-proof valves 115 of two battery cells 11 stacked in the vertical direction (the Z-axis direction), and the transition portion 312 has a straight plate structure, so that the first bus bar 31 avoids the explosion-proof valves 115 of the battery cells 11 on upper and lower layers through the transition portion 312. As shown in FIG. 6, the first end portion 311 corners upward (an upward direction on a Z axis) to be connected to the first electrode terminal 113 on the upper layer, and the second end portion 313 corners downward (a downward direction on the Z axis) to be connected to the second electrode terminal 114 on the lower layer, and the two battery cells 11 on the upper and lower layers may be stacked facing each other, or may be stacked adjacent to each other, so as to achieve an effect of avoiding the explosion-proof valves 115 of the two stacked battery cells 11. As shown in FIG. 6, in order to facilitate the mounting of a sampling component on the battery cell 11, a mounting opening 314 is provided on the transition portion 312 of the first bus bar 31, and the mounting opening 314 penetrates two side surfaces of the bus bar in the horizontal direction (the X-axis direction), that is, a groove connected on two sides is provided on a plate surface of the transition portion 312. Therefore, the sampling component can be arranged by passing through mounting openings 314 of a plurality of first bus bars 31, so that the sampling component is partially accommodated in the mounting openings 314 of the first bus bars 31, which improves the space utilization.

It should be noted that although the foregoing embodiments have been described herein, the protection scope of the present disclosure is not limited thereby. Therefore, based on innovative ideas of the present disclosure, changes and modifications to the embodiments described herein, or equivalent structures or equivalent process transformations made by using the description and drawings of the present disclosure, and direct or indirect application of the above technical solutions to other related technical fields, are all included in the protection scope of the present disclosure.

What is claimed is:

1. A battery module comprising:
    a first battery cell arrangement structure and a second battery cell arrangement structure stacked in a vertical direction, wherein the first battery cell arrangement structure and the second battery cell arrangement structure both comprise a plurality of battery cells arranged in a horizontal direction, each of the plurality of battery cells comprises a first electrode terminal, a second electrode terminal and a battery housing, and the first electrode terminal and the second electrode terminal are disposed on a surface of the battery housing; and
    a bus bar array, wherein the bus bar array electrically connects the plurality of battery cells, the bus bar array comprises a first bus bar, one end of the first bus bar is connected to the first electrode terminal of a first battery cell of the first battery cell array structure, the other end of the first bus bar is connected to the second electrode terminal of a second battery cell of the second battery cell arrangement structure, and the first bus bar extends in a first direction, and the first direction intersects the horizontal direction and the vertical direction,
    wherein the first bus bar comprises the one end, a transition portion and the other end, the one end is connected to the first electrode terminal of the first battery cell, the other end is connected to the second electrode terminal of the second battery cell, and the transition portion connects the one end and the other end;
    wherein the battery housing is provided with an explosion-proof valve, the explosion-proof valve is disposed between the first electrode terminal and the second electrode terminal, and the first bus bar is set to avoid the explosion-proof valve;
    wherein the transition portion is disposed between explosion-proof valves of two battery cells stacked in the vertical direction;
    wherein a spacing between the first electrode terminal and the second electrode terminal of one battery cell is equal to a spacing between the first electrode terminal and the second electrode terminal of another battery cell adjacent to the one battery cell in the same battery cell arrangement structure; and
    wherein the one end corners in a first cornering direction are connected to the first electrode terminal of the first battery cell of the first battery cell array structure, and the other end corners in a second cornering direction opposite to the first cornering direction are connected to the second electrode terminal of the second battery cell of the second battery cell array structure.

2. The battery module according to claim 1, wherein the first battery cell arrangement structure and the second battery cell arrangement structure are stacked to form one module, and a size of the one module in the horizontal direction is larger than a size of the one module in the vertical direction.

3. The battery module according to claim 1, wherein each of the plurality of battery cells further comprises:
    an electrode assembly, wherein the electrode assembly is accommodated in the battery housing, and the electrode assembly comprises a first electrode sheet, a second electrode sheet and a separator disposed between the first electrode sheet and the second electrode sheet, the first electrode terminal is electrically connected to the first electrode sheet, and the second electrode terminal is electrically connected to the second electrode sheet.

4. The battery module according to claim 3, wherein the electrode assembly is in a winding structure and is flat-shaped, an outer surface of the electrode assembly comprises two flat surfaces, and the two flat surfaces face each other in the vertical direction.

5. The battery module according to claim 3, wherein the electrode assembly is in a laminated structure, and the first electrode sheet, the separator and the second electrode sheet are stacked in the vertical direction.

6. The battery module according to claim 3, wherein the first electrode terminal and the second electrode terminal are located on the same surface of the battery housing.

7. The battery module according to claim 1, wherein the transition portion has a straight plate structure.

8. The battery module according to claim 1, wherein the one end, the transition portion and the other end are manufactured by integral molding.

9. The battery module according to claim 1, wherein the transition portion is provided with a mounting opening that penetrates the transition portion in the horizontal direction.

10. The battery module according to claim 1, wherein a shape of a cross section of the first bus bar parallel to the vertical direction and the horizontal direction is an "S"-shaped structure.

11. The battery module according to claim 1, wherein the bus bar array further comprises:
a second bus bar, wherein the second bus bar extends in the horizontal direction, two ends of the second bus bar are respectively connected to two adjacent battery cells in the horizontal direction, and the number of second bus bars is odd.

12. The battery module according to claim 11, wherein the bus bar array further comprises:
a third bus bar, wherein the third bus bar extends in a second direction, one end of the third bus bar is connected to the first electrode terminal of the first battery cell of the first battery cell arrangement structure, the other end of the third bus bar is connected to the second electrode terminal of the second battery cell of the second battery cell arrangement structure, and the second direction and the first direction are symmetrical in a vertical plane perpendicular to the horizontal direction.

13. The battery module according to claim 1, wherein the battery module further comprises a total positive electrode connecting piece and a total negative electrode connecting piece, the total positive electrode connecting piece is electrically connected to a total positive electrode of the battery module, and the total negative electrode connecting piece is electrically connected to a total negative electrode of the battery module; and
the total positive electrode connecting piece and the total negative electrode connecting piece are respectively located at two ends of the battery module in the horizontal direction.

14. The battery module according to claim 13, wherein both the total positive electrode connecting piece and the total negative electrode connecting piece are both connected to the first battery cell arrangement structure.

15. The battery module according to claim 1, wherein the battery housing comprises two first surfaces and two second surfaces, and an area of the first surface is larger than an area of the second surface; and
in a first battery cell of, the two second surfaces face each other in the horizontal direction, and the two first surfaces face each other in the vertical direction.

\* \* \* \* \*